(12) United States Patent
Anstey et al.

(10) Patent No.: US 12,255,315 B2
(45) Date of Patent: Mar. 18, 2025

(54) ANODE STRUCTURES HAVING A MULTIPLE SUPPLEMENTAL LAYERS

(71) Applicant: Graphenix Development, Inc., Williamsville, NY (US)

(72) Inventors: Robert G. Anstey, Tonawanda, NY (US); William P. McKenna, Rochester, NY (US); John M. Pochan, Penfield, NY (US); Bernard Philip Gridley, Walworth, NY (US); John C. Brewer, Rochester, NY (US); Paul D. Garman, Westerville, OH (US); Kevin Tanzil, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 362 days.

(21) Appl. No.: 17/573,886

(22) Filed: Jan. 12, 2022

(65) Prior Publication Data

US 2022/0223841 A1    Jul. 14, 2022

Related U.S. Application Data

(60) Provisional application No. 63/137,440, filed on Jan. 14, 2021.

(51) Int. Cl.
*H01M 4/38* (2006.01)
*H01M 4/04* (2006.01)
(Continued)

(52) U.S. Cl.
CPC ......... *H01M 4/366* (2013.01); *H01M 4/0428* (2013.01); *H01M 4/386* (2013.01);
(Continued)

(58) Field of Classification Search
CPC .... H01M 4/366; H01M 4/0428; H01M 4/386; H01M 4/58; H01M 4/626;
(Continued)

(56) References Cited

U.S. PATENT DOCUMENTS 5,567,474 A    10/1996  Dover et al.
5,776,369 A    7/1998   Dover et al.
(Continued)

FOREIGN PATENT DOCUMENTS

WO    WO2015175509 A1    11/2015
WO    WO2016057426 A1    4/2016
(Continued)

OTHER PUBLICATIONS

Cho, et al., *Electrochemical Properties of Si Film Electrodes Grown on Current Collectors with CuO Nanostructures for Thin-Film Micro-batteries*, Journal of Nanoscience and Nanotechnology, American Scientific Publishers, Dec. 2014, vol. 14, 9300-9306.
(Continued)

*Primary Examiner* — Maria Laios
*Assistant Examiner* — Ziheng Lu
(74) *Attorney, Agent, or Firm* — David D. Hsu; Polsinelli LLP

(57) ABSTRACT

An anode for an energy storage device is provided that includes a current collector having an electrically conductive layer, a plurality of lithium storage filamentary structures in contact with the electrically conductive layer. For each lithium storage filamentary structure of the plurality of lithium storage filamentary structures, there is a first supplemental layer overlaying at least a portion of the respective filamentary structure, the first supplemental layer including silicon nitride or a first metal compound. There is further a second supplemental layer overlaying at least a portion of the first supplemental layer, the second supplemental layer
(Continued)

having a composition different from the first supplemental layer and comprising silicon nitride or a second metal compound.

21 Claims, 8 Drawing Sheets

(51) Int. Cl.
  *H01M 4/36* (2006.01)
  *H01M 4/58* (2010.01)
  *H01M 4/62* (2006.01)
  *H01M 10/0525* (2010.01)
  *H01M 4/02* (2006.01)

(52) U.S. Cl.
  CPC ............. *H01M 4/58* (2013.01); *H01M 4/626* (2013.01); *H01M 10/0525* (2013.01); *H01M 2004/021* (2013.01); *H01M 2004/025* (2013.01); *H01M 2004/027* (2013.01)

(58) Field of Classification Search
  CPC ....... H01M 10/0525; H01M 2004/021; H01M 2004/025; H01M 2004/027
  See application file for complete search history.

(56) References Cited

U.S. PATENT DOCUMENTS

| | | |
|---|---|---|
| 5,976,403 A | 11/1999 | Dover et al. |
| 6,761,744 B1 | 7/2004 | Tsukamoto et al. |
| 6,911,280 B1 | 6/2005 | De Jonghe et al. |
| 7,378,041 B2 | 5/2008 | Asao et al. |
| 7,413,982 B2 | 8/2008 | Levy |
| 7,767,341 B2 | 8/2010 | Kogetsu et al. |
| 8,257,866 B2 | 9/2012 | Loveness et al. |
| 8,377,236 B2 | 2/2013 | Yakovleva et al. |
| 9,281,515 B2 | 3/2016 | Nazri |
| 9,293,771 B2 | 3/2016 | Tani et al. |
| 9,325,014 B2 | 4/2016 | Lee et al. |
| 9,376,455 B2 | 6/2016 | Lee et al. |
| 9,531,004 B2 | 12/2016 | Xiao et al. |
| 10,014,552 B1 | 7/2018 | Shnitser et al. |
| 10,115,960 B2 | 10/2018 | Lee et al. |
| 10,164,252 B2 | 12/2018 | Yang et al. |
| 10,686,214 B2 | 6/2020 | Liu et al. |
| 10,910,653 B2 | 2/2021 | Brewer et al. |
| 11,024,842 B2 | 6/2021 | O'Toole et al. |
| 2006/0216604 A1 | 9/2006 | Kawase et al. |
| 2010/0216026 A1 | 8/2010 | Lopatin et al. |
| 2010/0285358 A1 | 11/2010 | Cui et al. |
| 2010/0330421 A1* | 12/2010 | Cui .................. H01M 4/134 977/948 |
| 2011/0111304 A1 | 5/2011 | Cui et al. |
| 2011/0159365 A1 | 6/2011 | Loveness et al. |
| 2011/0266654 A1 | 11/2011 | Kuriki et al. |
| 2012/0077082 A1 | 3/2012 | Se-Hee et al. |
| 2012/0121983 A1 | 5/2012 | Yoon et al. |
| 2012/0251886 A1* | 10/2012 | Yushin .................. H01M 4/78 429/231.95 |
| 2013/0143124 A1 | 6/2013 | Lee et al. |
| 2014/0011088 A1 | 1/2014 | Lopatin et al. |
| 2014/0248543 A1* | 9/2014 | Zhu ................... H01M 10/0525 205/60 |
| 2015/0072119 A1 | 3/2015 | George et al. |
| 2015/0118572 A1 | 4/2015 | Lund et al. |
| 2015/0325852 A1 | 11/2015 | Wang et al. |
| 2016/0190564 A1 | 6/2016 | Samarao et al. |
| 2016/0351973 A1 | 12/2016 | Albano et al. |
| 2017/0170477 A1* | 6/2017 | Sakshaug ............ C04B 38/0064 |
| 2017/0309903 A1* | 10/2017 | Peled .................. H01M 4/366 |
| 2017/0338464 A1 | 11/2017 | Fasching et al. |
| 2018/0083264 A1 | 3/2018 | Soppe |
| 2018/0145367 A1 | 5/2018 | Busacca et al. |
| 2018/0166735 A1 | 6/2018 | Busacca et al. |
| 2019/0044151 A1* | 2/2019 | Elam .................. C23C 16/45527 |
| 2019/0097275 A1 | 3/2019 | Mitlin et al. |
| 2019/0267361 A1 | 8/2019 | Brewer et al. |
| 2020/0274151 A1* | 8/2020 | Yu ........................ H01M 4/58 |
| 2021/0050584 A1 | 2/2021 | Brewer et al. |
| 2021/0057733 A1 | 2/2021 | Brewer et al. |
| 2021/0057757 A1 | 2/2021 | Brewer et al. |
| 2021/0066702 A1 | 3/2021 | O'Toole et al. |
| 2022/0052316 A1 | 2/2022 | Collins et al. |

FOREIGN PATENT DOCUMENTS

| | | |
|---|---|---|
| WO | 2021241130 A1 | 2/2021 |
| WO | WO2021029769 A1 | 2/2021 |

OTHER PUBLICATIONS

Cho et al.,, *Enhanced Lithium Ion battery Cycling of Silicon Nanowire Anodes by Template Growth to Eliminate Silicon Underlayer Islands*, NANO Letters, Oct. 2013. vol. 13, 5740-5747.
Corte, et al. *Effects du traitment chimique de la surface d'une*, Ecole Polytechnique Paris Tech, Oct. 2013, 1-139.
Domi, et al., , *Effect of Mechanical Pre-Lithiation on Electrochemical Performance of Silicon Negative Electrode for Lithium-Ion Batteries*, J. Electrochem. Soc. 164(7) A1651-A1654 (Jan. 2017).
Duh, et al., *Silicon nitride coated silicon thin film on three dimensions current collector for lithium ion battery anode*, J. Power Sources 325 (Sep. 2016) 64-70.
Fang, et al., *Dual-Design of Nanoporous to Compact Interface via Atomic/Molecular Layer Deposition Enabling a Long-Life Silicon Anode*, Adv. Funct. Mater. 2021, adfm. 202109682, 21 pages.
George, et al., *Growth and Properties of Hybrid Organic-Inorganic Metalcone Films Using Molecular Layer Deposition Techniques*, Advanced Functional Materials · Feb. 2013, 532-546.
Gòmez-Baquero, et al., *Silicon Anodes to Enable Better Lithium Ion Batteries*, Besstech, LLC ResearchGate, Apr. 2016, 1-28.
Haro, et al., *Nano-vault architecture mitigates stress in silicon based anodes for lithium-ion batteries*, Communications Materials | 2:16 (Feb. 5, 2021) 10 pages.
Holtstiege, et al., *Pre-Lithiation Strategies for Rechargeable Energy Storage Technologies: Concepts*, Promises and Challenges, Batteries, Jan. 2018, https://doi.org/10.3390/batteries4010004 all pages.
Huang, et al., *Alumina-Coated Patterned Amorphous Silicon as the Anode for a Lithium-Ion Battery with High Coulombic Efficiency*, Adv. Mater. Nov. 2011, 23, 4938-4941.
Huertas, et al., *High performance silicon electrode enabled by titanicone coating*, Scientific Reports, 12(1), 137 (Jan. 7, 2022).
Kim, et al., *Electrochemical characteristics of Si/Mo multilayer anode for Li ion batteries*, Revista Mexicana De Fisica S53, Jan. 2007, 17-20.
Kozen et al., *Atomic Layer Deposition of the Solid Electrolyte LiPON*, Chem. Mater. Jul. 2015, 27, 5324-5331.
Lee, et al., *Atomic Layer Deposition for Stabilization of Silicon Anodes*, NREL Report ( Jun. 17, 2014), 25 pages.
Li, et al., *Artificial Solid Electrolyte Interphase To Address the Electrochemical Degradation of Silicon Electrodes*, dx.doi.org/10.1021/am5009419 | ACS Appl. Mater. Interface Jun. 2014, 6, 10083-10088.
Liu, et al., *Recent Applications of Molecular Structures at Silicon Anode Interfaces*, Electrochem 2021, 2, 664 (Dec. 18, 2021), 13 pages.
Nguyen, et al., *Alumina-coated silicon-based nanowire arrays for high quality Li-ion battery anodes*, J. Mater. Chem., Sep. 2012, 22, 24618-24626.
Nominanda, et al., *Process and Material Properties of PECVD Boron-Doped Amorphous Silicon Film*, https://www.electrochem.org/dl/ma/201/pdfs/0399.pdf (pub date unknown).
Notten, et al., *Advanced Energy Storage Materials for Battery Applications*, Advanced Materials, Dec. 12, 2012, 1-50, NL Agency Ministry of Economic Affairs, Agriculture and Innovation.

(56) References Cited

OTHER PUBLICATIONS

Pearse, et al., *Nanoscale Solid State Batteries Enabled By Thermal Atomic Layer Deposition of a Lithium Polyphosphazene Solid State Electrolyte*, Chem. Mater. Mar. 2017, 29, 8, 3740-3753.

Piwko., et al., *Hierarchical columnar silicon anode structures for high energy density lithium sulfur batteries*, Journal of Power Sources 351 (Mar. 2017) 183-191.

Quiroga-Gonzalez et al., *Optimal Conditions for Fast Charging and Long Cycling Stability of Silicon Microwire Anodes for Lithium ion Batteries, and Comparison with the Performance of Other Si Anode Concepts*, Energies, Oct. 2013, vol. 6, 5145-5156.

Sakabe et al., *Porous amorphous silicon film anodes for highcapacity and stable all-solid-state lithium batteries*, Communications Chemistry (May 2018)1:24.

Salah, et al., *Pure silicon thin-film anodes for lithium ion batteries: A review*, Journal of Power Sources, Feb. 2019, vol. 414, 48-67, Elsevier.

Soppe, et al., *Self-Organized Nano-Structured Silicon as Anode Material for Li-Ion Batteries*, Meeting of Materials Research Society, Apr. 2-6, 2018, 1 page, Phoenix, Arizona.

Stefan, et al., *A Commercially Scalable Process for Silicon Anode Prelithiation*, Amprius Inc, DOE Merit Review, Jun. 6-10, 2016, Project ES250 , all pages, https://www.energy.gov/sites/prod/files/2016/06/f32/es250_stefan_2016_o_web.pdf.

Ulvestad, et al., *Silicon nitride as anode material for Li-ion batteries: Understanding the SiNx conversion reaction*, J. Power Sources 399 (Sep. 2018) 414-421.

Wu et al., *Silicon Nitride Coated Silicon Thin Films as Anodes for Li-Ion Batteries*, ECS Transactions, 64 (22) 107-111 (Apr. 2015).

Xu, et al., *A high-performance Li-ion anode from direct deposition of Si nanoparticles*, Nano Energy 38 (Aug. 2017) 477-485.

Xu, et al., *Engineering the Direct Deposition of Si Nanoparticles for Improved Performance in Li-Ion Batteries*, J. Electrochem. Soc. 166(3) A5252-A5258 (Dec. 2019), all pages.

Yang, Jinho, *Development Of Silicon-Based Anodes And In-Situ Characterization Techniques For Lithium Ion Batteries*, Jinho Yang Dissertation, Wayne State University (Jan. 2014), all pages.

Zhou, et al., *A general prelithiation approach for group IV elements and corresponding oxides*, Energy Storage Materials (Jan. 2017), pp. 275-281.

Zhu, et al., *Achieving High-Performance Silicon Anodes of Lithium-Ion Batteries via Atomic and Molecular Layer Deposited Surface Coatings: an Overview*, Electrochimica Acta 251 (Sep. 2017) 710-728.

\* cited by examiner

160

ANODE STRUCTURES HAVING A MULTIPLE SUPPLEMENTAL LAYERS

CROSS-REFERENCE TO RELATED APPLICATIONS

This application claims the benefit of priority to U.S. Provisional Patent Application Ser. No. 63/137,440, filed Jan. 14, 2021, which is incorporated by reference herein in its entirety.

TECHNICAL FIELD

The present disclosure relates to lithium-ion batteries and related energy storage devices.

BACKGROUND

Silicon has been proposed as a potential material for lithium-ion batteries to replace the conventional carbon-based anodes which have a storage capacity that is limited to ~370 mAh/g. Silicon readily alloys with lithium and has a much higher theoretical storage capacity (3600 to 4200 mAh/g at room temperature) than carbon-based anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon. Relative to a simple layer of silicon, however, the nanostructured silicon may be very fragile to handling and have lower volumetric charge capacity. Further, nanostructured silicon has yet to yield reliable lifetime and cycling stability.

SUMMARY

There remains a need for anodes for lithium-based energy storage devices such as Li-ion batteries that are easy to manufacture, robust to handling, high in charge capacity, amenable to fast charging, and long in charge/discharge cycle lifetime.

In accordance with an embodiment of this disclosure, an anode for an energy storage device is provided that includes a current collector having an electrically conductive layer, a plurality of lithium storage filamentary structures in contact with the electrically conductive layer. For each lithium storage filamentary structure of the plurality of lithium storage filamentary structures, there is a first supplemental layer overlaying at least a portion of the respective filamentary structure, the first supplemental layer including silicon nitride or a first metal compound. There is further a second supplemental layer overlaying at least a portion of the first supplemental layer, the second supplemental layer having a composition different from the first supplemental layer and comprising silicon nitride or a second metal compound.

In accordance with another embodiment of the present disclosure a method of making an anode for use in an energy storage device includes providing a current collector having an electrically conductive layer, wherein the electrically conductive layer includes a filament growth catalyst. Lithium storage filamentary structures are formed on the electrically conductive layer using a CVD process. For each lithium storage filamentary structure of the plurality of lithium storage filamentary structures a first supplemental layer is deposited over at least a portion of the respective filamentary structure, the first supplemental layer including silicon nitride or a first metal compound. A second supplemental layer is deposited over at least a portion of the first supplemental layer, the second supplemental layer having a composition different from the first supplemental layer and including silicon nitride or a second metal compound.

The present disclosure provides anodes for energy storage devices that may have one or more of the following advantages relative to conventional anodes: improved stability at aggressive >1C charging rates; higher overall areal charge capacity; higher charge capacity per gram of silicon; improved physical durability; simplified manufacturing process; and more reproducible manufacturing process. The anodes and energy storage devices may also have other advantages.

DETAILED DESCRIPTION

It is to be understood that the drawings are for purposes of illustrating the concepts of the disclosure and may not be to scale.

Anode Overview

Figure 1:
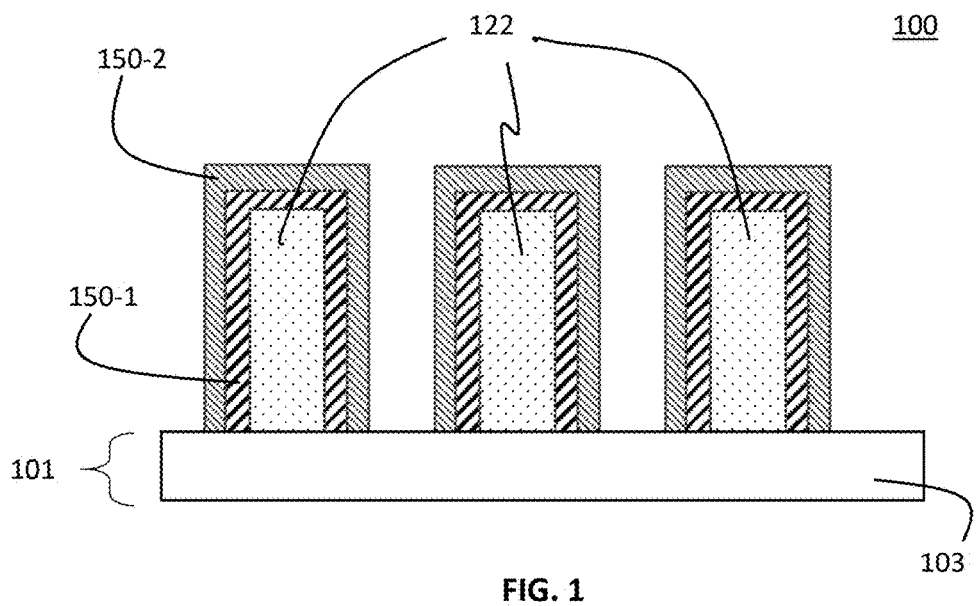
FIG. 1 is a cross-sectional view of an anode according to some embodiments of the present disclosure.

FIG. 1 is a cross-sectional view according to some embodiments of the present disclosure. Anode 100 includes current collector 101 comprising an electrically conductive layer 103. A plurality of lithium storage filamentary structures 122 are in contact with the electrically conductive layer 103. For example, lithium storage filamentary structures 122 may be in electrical communication with the electrically conductive layer 103 such that a current may pass between the two components. A first supplemental layer 150-1 overlays at least a portion of the lithium storage filamentary structures and a second supplemental layer 150-2 overlays at least a portion of the first supplemental layer. Although the lithium storage filamentary structures are shown in FIG. 1 in contact with a top of the current collector, in some embodiments, lithium storage filamentary structures are formed on both the top and bottom surfaces of the current collector.

Electrically Conductive Layer

Figure 2:
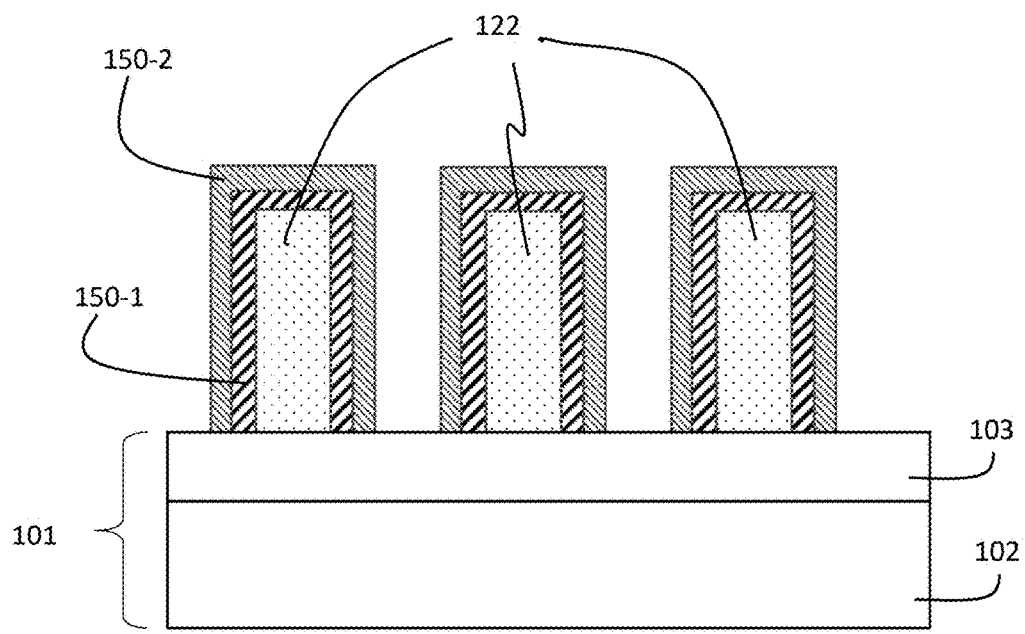
FIG. 2 is a cross-sectional view of an anode according to some embodiments of the present disclosure.

In some embodiments, the electrically conductive layer 103 may be a conductive foil or mesh, e.g., one including copper, nickel, titanium, stainless steel, or a conductive carbon. In some embodiments, the electrically conductive layer includes a metallic material, e.g., titanium (and its alloys), nickel (and its alloys), copper (and its alloys), or stainless steel. In some embodiments, the electrically conductive layer includes an electrically conductive carbon, such as carbon black, graphene, graphene oxide, graphite, carbon nanotubes, or fullerene. In some embodiments the electrically conductive layer may be in the form of a foil or sheet of conductive material, or alternatively a mesh structure or fabric-like structure, or alternatively a layer deposited onto an insulating substrate. In some embodiments the electrically conductive layer may have an electrical conductivity of at least 1 S/m, $10^3$ S/m, or alternatively at least $10^6$ S/m, or alternatively at least 10'S/m, and may include inorganic or organic conductive materials or a combination thereof. In some embodiments, as shown in FIG. 2, the current collector 101 may have a multilayer structure with the electrically conductive layer 103 provided over a substrate 102. The substrate may be electrically conductive or insulating and may itself have a multilayer structure. Not shown, a second electrically conductive layer may in some embodiments be provided on the bottom surface of the substrate.

Lithium Storage Filamentary Structures

Figure 3:
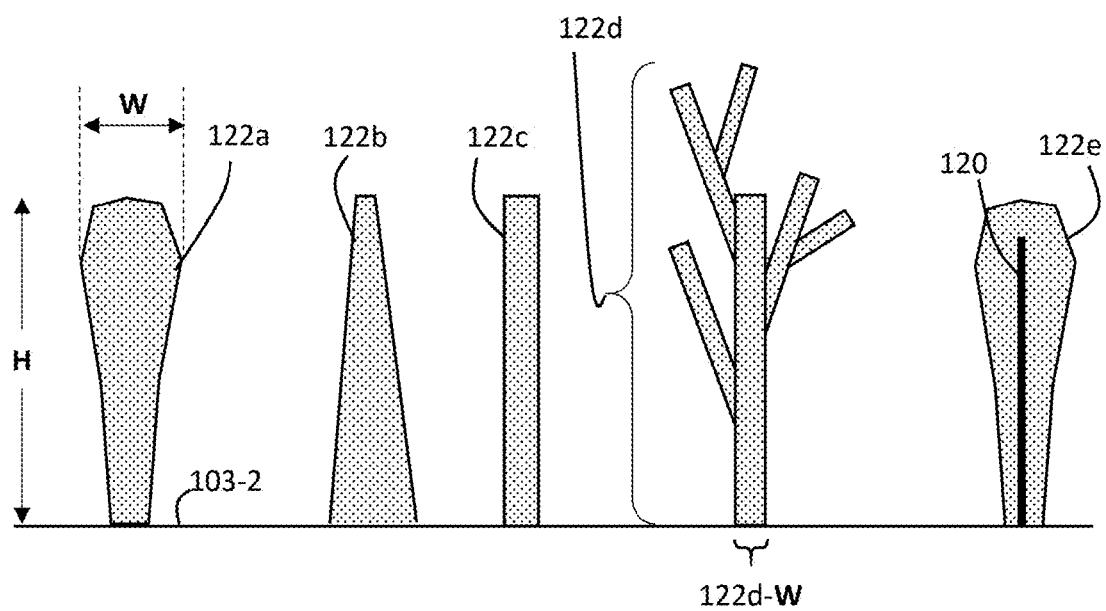
FIG. 3 is a cross-sectional view of lithium storage filamentary structures according to some embodiments of the present disclosure.

Lithium storage filamentary structures 122 are formed in contact with the electrically conductive layer 103. The lithium storage filamentary structures may include a material capable of reversibly incorporating lithium. In some embodiments, the lithium storage filamentary structures may include a porous lithium storage material. In some embodiments, the lithium storage filamentary structures may include silicon, germanium, tin, antimony, or a combination thereof. In some embodiments, the lithium storage filamentary structures may exclude any of these elements or combination of these elements. In some embodiments, the lithium storage filamentary structures 122 may include lithium storage nanowires or nanopillars. In some embodiments, the lithium storage filamentary structures may have an aspect ratio of at least 2:1. As shown in FIG. 3, the aspect ratio of a lithium storage filamentary structure refers to the ratio of its maximum height H to its maximum width W. The maximum height refers to how far the filament extends from the surface of the electrically conductive layer 103. The maximum width is measured generally orthogonal to the axis of the lithium storage filamentary structure. The axis may be the longitudinal axis of the lithium storage filamentary structure or a branch or trunk of the lithium storage filamentary structure. The axis may be an axis about which the lithium storage filamentary structure is symmetrical. In some embodiments, the maximum width may be the width of a cross-sectional slice of the lithium storage filamentary structure, where the cross-sectional slice has the minimum area for a slice going through a given point of the lithium storage filamentary structure. In some embodiments, the maximum width may be measured in a direction parallel to the surface of electrically conductive layer 103. The lithium storage filamentary structures may take on a variety of shapes. The width of the lithium storage filamentary structure may vary as a function of filament height. As shown in FIG. 3, in some embodiments, lithium storage filamentary structures 122a may have a bulbous end away from the surface of the electrically conductive layer. In some embodiments, lithium storage filamentary structures 122b may be wider near the surface of the electrically conductive layer. In some embodiments, lithium storage filamentary structures 122c may have a uniform width as a function of filament height or as a function of the length of the filament from its point of contact with the electrically conductive layer. In some embodiments, lithium storage filamentary structures 122d may be branched, wherein maximum width 122d-W is measured across the widest trunk (as in this case) or branch. In some embodiments, lithium storage filamentary structures 122e may include a core filament 120, e.g., a metal or silicide nanowire, that may be more electrically conductive than surrounding lithium storage material making up the lithium storage filamentary structure.

In some embodiments, at least some of the lithium storage filamentary structures may have an aspect ratio of at least 2:1 (defined above), alternatively at least 3:1, alternatively at least 4:1, alternatively at least 5:1, alternatively at least 7:1, alternatively at least 10:1. In some embodiments, the majority of the lithium storage filamentary structures have an aspect ratio in a range of 3:1 to 100:1, alternatively in a range of 3:1 to 5:1, alternatively in a range of 5:1 to 10:1, alternatively in a range of 10:1 to 20:1, alternatively in a range of 20:1 to 50:1, alternatively in a range of 50:1 to 100:1, or any combination of ranges thereof. The aspect ratio described herein may represent the mean average, median, or mode of the lithium storage filamentary structures. In addition, the aspect ratios may describe a percentage of the lithium storage filamentary structures, including at least 50%, 60%, 70%, 80%, 90%, 95%, 99%, or 100% of the lithium storage filamentary structures.

In some embodiments, at least some of the lithium storage filamentary structures have a height of at least 0.2 µm, alternatively 0.5 µm, alternatively at least 1.0 µm, alternatively at least 3 µm, alternatively at least 5 µm, alternatively at least 10 µm. In some embodiments, at least some of the lithium storage filamentary structures have a height of less than 500 µm, alternatively less than 250 µm, alternatively less than 100 µm, alternatively less than 75 µm, alternatively less than 50 µm, alternatively less than 25 µm, alternatively less than 20 µm, alternatively less than 15 µm, alternatively less than 10 µm, alternatively less than 7 µm. In some embodiments, the lithium storage filamentary structures collectively have an average height in a range of 0.2 µm to 0.5 µm, alternatively in a range of 0.5 µm to 1 µm, alternatively in a range of 1 µm to 2 µm, alternatively in a range of 2 µm to 5 µm, alternatively in a range of 5 µm to 10 µm, alternatively in a range of 10 µm to 20 µm, alternatively in a range of 20 µm to 30 µm, alternatively in a range of 30 µm to 40 µm, alternatively in a range of 40 µm to 50 µm, alternatively in a range of 50 µm to 75 µm, alternatively in a range of 75 µm to 100 µm, or any combination of ranges thereof. The height described herein may represent the mean average, median, or mode of the lithium storage filamentary structures. In addition, the heights may describe a percentage of the lithium storage filamentary structures, including at least 50%, 60%, 70%, 80%, 90%, 95%, 99%, or 100% of the lithium storage filamentary structures.

In some embodiments, at least some of the lithium storage filamentary structures have a maximum width of at least 0.01 µm, alternatively 0.02 µm, alternatively at least 0.05 µm, alternatively at least 0.1 µm, alternatively at least 0.25 µm, alternatively at least 0.5 µm, alternatively at least 1 µm, alternatively at least 2 µm, alternatively at least 3 µm, alternatively at least 5 µm, alternatively at least 10 µm, alternatively at least 20 µm, alternatively at least 50 µm. In some embodiments, at least some of the lithium storage filamentary structures have a maximum width of less than 50 µm, alternatively less than 20 µm, alternatively less than 10 µm, alternatively less than 7 µm, alternatively less than 5 µm, alternatively less than 4 µm, alternatively less than 3 µm, alternatively less than 2 µm, alternatively less than 1 µm, alternatively less than 0.1 µm. In some embodiments, the lithium storage filamentary structures collectively have a maximum width in a range of 0.1 µm to 0.2 µm, alternatively in a range of 0.2 µm to 0.5 µm, alternatively in a range of 0.5 µm to 1 µm, alternatively in a range of 1 µm to 2 µm, alternatively in a range of 2 µm to 3 µm, alternatively in a range of 3 µm to 4 µm, alternatively in a range of 4 µm to 5 µm, or any combination of ranges thereof. The widths described herein may represent the mean average, median, or mode of the lithium storage filamentary structures. In addition, the widths may describe a percentage of the lithium storage filamentary structures, including at least 50%, 60%, 70%, 80%, 90%, 95%, 99%, or 100% of the lithium storage filamentary structures.

In some embodiments, the lithium storage filamentary structures include silicon, germanium, antimony, tin, or a combination thereof. In some embodiments, the lithium storage filamentary structures include a transition metal silicide or a transition metal alloy of germanium. In some embodiments the lithium storage filamentary structures have a total content of silicon, germanium, or a combination thereof, of at least 30 atomic %, alternatively, at least 40%, alternatively at least 50%, alternatively at least 60%, alternatively at least 70%.

Methods of growing lithium storage filaments may include, but are not limited to, CVD and PECVD methods described in U.S. Pat. Nos. 9,325,014 and 8,257,866, the entire contents of which are incorporated by reference for all purposes.

In some embodiments, the surface of the electrically conductive layer 103 includes a filament growth catalyst material. A filament growth catalyst material assists in initiating and growing the filament. For the purposes of this disclosure, filament growth catalyst materials include "true" catalytic materials that remain active indefinitely, and materials that may eventually be consumed during filament growth. In some embodiments the filament growth catalyst material may be a vapor-liquid-solid (VLS) filament growth catalyst material. In some embodiments the filament growth catalyst material may be provided as a substantially continuous layer that corresponds to the surface of electrically conductive layer 103. In some embodiments, the surface of electrically conductive layer 103 may include a pattern of filament growth catalyst material where the pattern may be random or predetermined. In some embodiments the electrically conductive layer may be a metal foil that is itself a filament growth catalyst material, and the surface of electrically conductive layer 103 may simply be a clean surface of the foil. Non-limiting examples of catalyst materials may include non-refractory transition metals and their alloys. The catalyst material may include, for example, nickel, gold, palladium, platinum, ruthenium, aluminum, indium, gallium, tin, or iron, or their alloys.

Figure 4A:
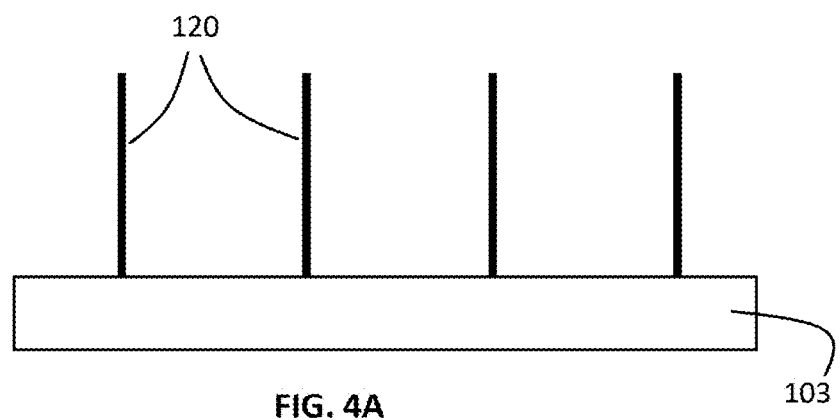
FIGS. 4A-4C are a series of cross-sectional views showing the preparation of an anode according to some embodiments of the present disclosure.

Referring to FIG. 4A, in some embodiments, growing lithium storage nanostructures may include growing a plurality of core filaments 120 on the electrically conductive layer. In some embodiments this is done by VLS method whereby the current collector is exposed to a filament precursor gas under elevated temperatures. The temperature depends on the catalyst and filament precursor gas, but in some embodiments may be at least 300° C., alternatively from 300° C. to 400° C., alternatively at least from 400° C. to 500° C., alternatively, at least from 500° C. to 600° C., or alternatively at least 600° C. In some embodiments, the filament precursor gas is a silicon-containing gas such as silane or a germanium-containing gas such as germane, but alternative silicon- and germanium-containing gases may be used. In some embodiments, the filaments include a silicide or germanium alloy. The core filaments may be electrically conductive or semi-conductive. In some embodiments the filament growth catalyst material may include nickel and the filaments include nickel silicide. In some embodiments, the filament growth catalyst material may be consumed during formation of the filaments.

Figure 4B:
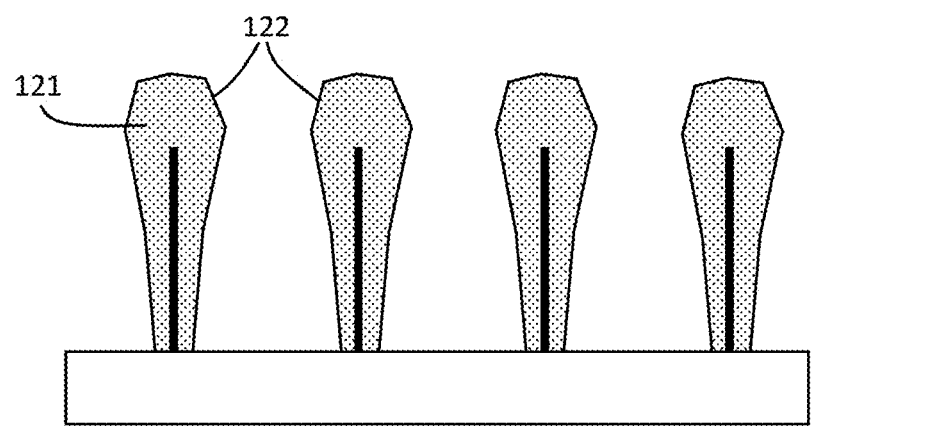

As shown in FIG. 4B, in some embodiments, a plurality of lithium storage filamentary structures 122 may be formed by depositing a lithium storage coating 121 over the core filament 120. Lithium storage coating 121 may have a different chemical composition than core filament 120. In some embodiments, the lithium storage coating may include silicon, germanium, tin, or a combination thereof. In some embodiments, the lithium storage filamentary structures are formed at least in part by a CVD (chemical vapor deposition) process, such as thermal CVD, HWCVD (hot-wire CVD), and/or PECVD (plasma enhanced chemical vapor deposition). In some embodiments, core filaments 120 may be grown by a thermal CVD process and lithium storage coating 121 may be deposited by HWCVD or PECVD. The vapor deposition process may include a lithium storage precursor gas that contains silicon (e.g., silane), germanium (e.g., germane), or tin (e.g., Sn(IV) tert-butoxide). In some embodiments, core filaments 120 may be grown in a separate step or chamber than lithium storage coating 121 deposition. In some embodiments, core filaments 120 may be grown in the same chamber as used for depositing lithium storage coating 121. In some embodiments, the growth of core filaments and formation of lithium storage filamentary structures 122 may be performed in a common step without substantially changing conditions, e.g., by using a catalyst that is consumed, such that core filament formation stops and deposition of lithium storage coating 121 begins. That is, the core filament formation may be self-limiting. Alternatively, conditions may be altered after core filament growth (temperature, precursor gas, gas pressure, plasma power, deposition angle, or the like) to promote deposition of lithium storage coating 121 and formation of the lithium storage filamentary structures 122. In some embodiments, the core filamentary structures may include a metal silicide core filament 120 (e.g., a nickel silicide) and a silicon-containing lithium storage coating 121 that may also contain some of the metal but at a lower atomic % than the core filament. That is, the lithium storage coating 121 may have a higher atomic % silicon than the core filament 120. In some embodiments, rather than forming a core filament followed by deposition of the lithium storage coating, the lithium storage filamentary structures may be formed in a single step or a continuous set of steps without need for a core filament template. Such structures may have a compositional gradient extending from a core region towards the outer surface of the lithium storage filamentary structures. For example, the core region of the lithium storage filamentary structure may have a higher atomic % of a metal than in portions extending away from the core region.

Figure 4C:
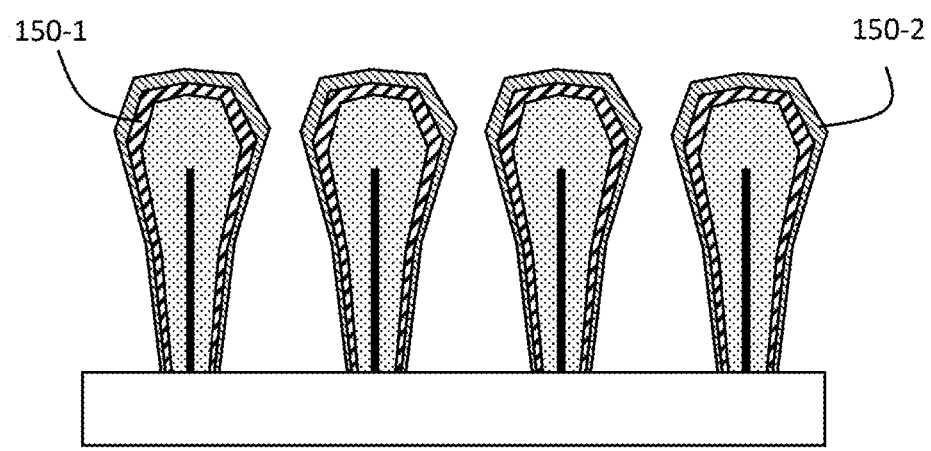

As shown in FIG. 4C, a first supplemental layer 150-1 may be formed overlaying at least a portion of the lithium storage filamentary structures 122 and a second supplemental layer 150-2 may be formed overlaying at least a portion of the first supplemental layer. In some embodiments, one or more supplemental layers may conformally coat the lithium storage filamentary structures. In some embodiments, one or more supplemental layers may coat only a portion of the filamentary structure or underlying supplemental layer. In some embodiments, one or more supplemental layers may be formed asymmetrically over the lithium storage filamentary structures, including but not limited to, embodiments where the thickness of a supplemental layer is higher at the top of a lithium storage filamentary structure relative to the bottom. Not shown in FIG. 4C, in some embodiments, one or more supplemental layers may coat or partially coat the electrically conductive layer in areas between the lithium storage filamentary structures.

In some embodiments, the anode includes silicon-containing lithium storage filamentary structures that provide a total silicon content of at least 1 mg/cm$^2$, alternatively at least 2 mg/cm$^2$, alternatively at least 3 mg/cm$^2$, alternatively at least 10 mg/cm$^2$, alternatively at least 15 mg/cm$^2$. In some embodiments, the anode includes silicon-containing lithium storage filamentary structures that provide a total silicon content in a range of 1-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, alternatively in a range of 20-30 mg/cm$^2$, alternatively in a range of 30-40 mg/cm$^2$, alternatively in a range of 40-50 mg/cm$^2$, or any combination of ranges thereof. In some embodiments, not all of the silicon content is available for lithium storage and may be tied up in the form of silicides.

CVD

CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage filamentary structures, a supplemental layer (see below) or other layers. It may be done in hot-wall reactors or cold-wall reactors, at sub-torr total pressures to above-atmospheric pressures, with and without carrier gases, and at temperatures ranging from 100–1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, and plasma energy (if applicable).

As mentioned, the lithium storage filamentary structures, e.g., those containing silicon, germanium, tin, or a combination, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD may be used to deposit a substantially amorphous silicon material (optionally doped).

PECVD

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used.

PECVD process conditions (temperatures, pressures, precursor gases, flow rates, energies and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas used, the silicon layer may be formed by decomposition or reaction with another compound, such as by hydrogen reduction.

Supplemental Layers

The first supplemental layer 150-1 may include silicon nitride or a first metal compound. The second supplemental layer 150-2 has a composition different from the first supplemental layer and may include silicon nitride or a second metal compound.

In some embodiments, the combination of the first supplemental layer 150-1 and the second supplemental layer 150-2 may help stabilize the lithium storage filamentary structures by providing a barrier to direct electrochemical reactions with solvents or electrolytes that can degrade the interface. In some embodiments, the supplemental layers are conductive to lithium ions and permit lithium ions to move into and out of the lithium storage filamentary structures during charging and discharging. In some embodiments, the lithium ion conductivity of each supplemental layer may be at least $10^{-9}$ S/cm, alternatively at least $10^{-8}$ S/cm, alternatively at least 10'S/cm, or alternatively at least 10'S/cm. In some embodiments, the outermost supplemental layer may function in part as a solid-state electrolyte. In some embodiments, the supplemental layers are less electrically conductive than the lithium storage filamentary structures so that little or no electrochemical reduction of lithium ions to lithium (0) occurs at the supplemental layer/electrolyte interface. In addition to providing protection from electrochemical reactions, the multiple supplemental layer structure may provide superior structural support. In some embodiments, although the supplemental layers may flex and may form fissures when a lithium storage filamentary structures expand during lithiation, crack propagation can be distributed between the layers to reduce direct exposure of the lithium storage filamentary structure to the bulk electrolyte. For example, a fissure in the second supplemental layer may not align with a fissure in the second supplemental layer. Such an advantage will not occur if just one thick supplemental layer is used. In an embodiment, the second supplemental layer is formed of a material having higher flexibility than the first supplemental layer.

In some embodiments, a supplemental layer (the first supplemental layer, the second supplemental layer, or any additional supplemental layer(s)), may include silicon nitride, e.g., substantially stoichiometric silicon nitride where the ratio of nitrogen to silicon is about 1.33, alternatively in a range of 1.33 to 1.25. A supplemental layer comprising silicon nitride may have a thickness in a range of about 0.5 nm to about 50 nm, alternatively about 5 nm to about 40 nm, alternatively 1 nm to 10 nm, alternatively 10 nm to 20 nm, alternatively 20 nm to 30 nm, alternatively 30 nm to 40 nm, alternatively 40 nm to 50 nm, or any combination of ranges thereof. Silicon nitride may be deposited by an atomic layer deposition (ALD) process or by a CVD process. In some embodiments, the lithium storage filamentary structures include silicon deposited by a CVD process as described above, and at the end, a nitrogen gas source is added to the CVD deposition chamber along with the silicon source.

In some embodiments a supplemental layer (the first supplemental layer, the second supplemental layer, or any additional supplemental layer(s)) may include a metal compound. In some embodiments, the metal of the metal compound may include a transition metal. Unless otherwise noted, the term "transition metal" as used anywhere in the present application includes any element in groups 3 through 12 of the periodic table, including lanthanides and actinides. In some embodiments, the metal of the metal compound may include aluminum, titanium, vanadium, zirconium, hafnium, niobium, tungsten, molybdenum, zinc, chromium, copper, nickel, cobalt, iron, vanadium, tantalum, scandium, yttrium, gallium, indium, germanium or tin, or mixtures thereof. In some embodiments, the metal compound may include is a metal oxide, metal nitride, or metal oxynitride. In some embodiments a metal oxide or metal oxynitride may include some corresponding metal hydroxide. In some embodiments, a supplemental layer including a simple metal oxide, metal nitride, or metal oxynitride, may have an average thickness of less than about 100 nm, for example, in a range of about 0.5 nm to about 50 nm, or alternatively in a range of about 5 nm to about 40 nm, alternatively 1 nm to 10 nm, alternatively 10 nm to 20 nm, alternatively 20 nm to 30 nm, alternatively 30 nm to 40 nm, alternatively 40 nm to 50 nm, or any combination of ranges thereof. The metal oxide, metal nitride, or metal oxynitride may include other components or dopants such as phosphorous or silicon.

In some embodiments, it has been found that a first supplemental layer having an oxide of titanium and a second supplemental layer having an oxide of another metal such as aluminum may have superior cycle life performance than when the two layers are reversed, e.g., where the first supplemental layer includes an oxide of aluminum and the second supplemental layer includes an oxide of titanium.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

Figure 5A:
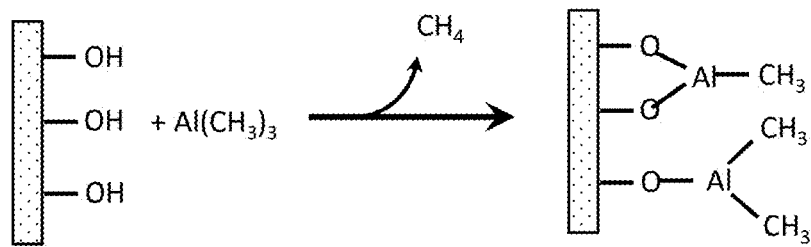
FIGS. 5A-5C show an example set of processing steps for forming an inorganic-organic hybrid structure.
Figure 5B:
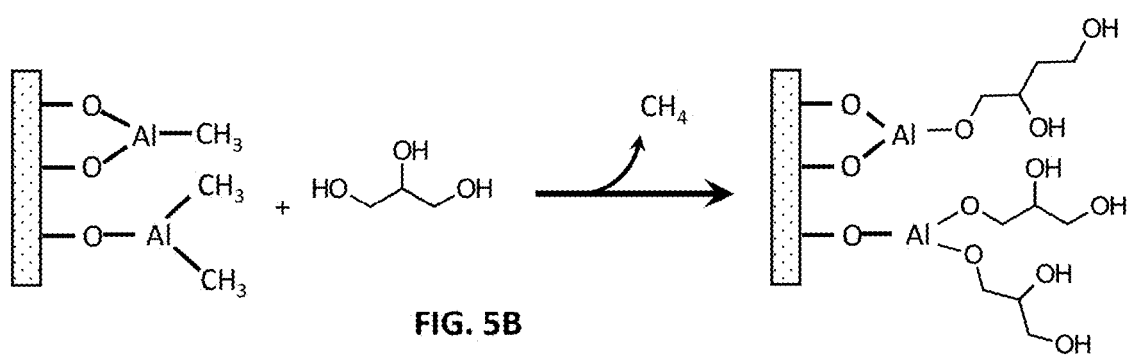
Figure 5C:
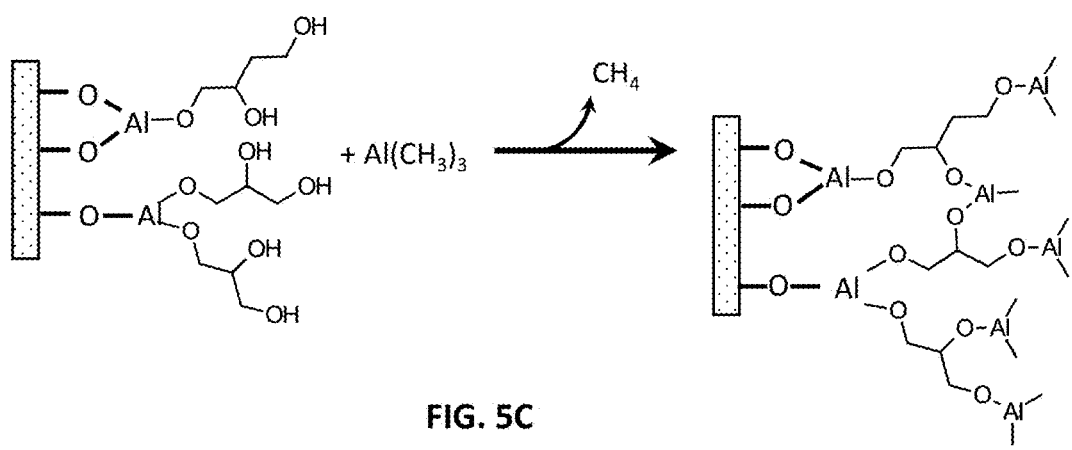

In some embodiments, the metal compound may include an organic material bound to a metal or to a metal oxide. In some embodiments, a supplemental layer may include an inorganic-organic hybrid structure having alternating sublayers of metal oxide and bridging organic materials such as so-called "metalcone" materials (and which are herein included as a type of metal compound that may be suitable for one or more supplemental layers). In some embodiments, a supplemental layer that includes a metalcone may provide improved flexibility to accommodate volume changes in the lithium-storage material during lithiation and de-lithiation. Metalcones may be made using a combination of atomic layer deposition to apply the metal oxide and molecular layer deposition (MLD) to apply the organic. This may also form a coating that is largely conformal due to the self-limiting nature of the reactions. The organic bridge is typically a molecule having multiple functional groups. One group can react with a sublayer comprising a metal oxide and the other group is available to react in a subsequent ALD step to bind a new metal. The process is shown schematically in FIGS. 5A-5C wherein the metal is aluminum and the reactive organic functional groups are hydroxy groups of glycerol. There is a wide range of reactive organic functional groups that may be used including, but not limited to hydroxy, carboxylic acid, amines, acid chlorides and anhydrides. Although not shown, the structure in FIG. 5C may be treated again with glycerol or some other reactive organic material to react with aluminum and release methane. Alternatively, the methyl-aluminum bonds of FIG. 5C may be oxidized with an oxygen source. In any event, the cycle can continue to optionally form numerous alternating sublayers, which can end with either application of the reactive organic material (i.e., the final organic layer is not functioning as a bridge to another metal layer) or with the metal-containing material. Components of the sublayers can be varied between cycles. For the purposes of the present disclosure, this alternating sublayer structure is considered a single supplemental layer. Almost any metal precursor suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris(dimethylamino)cyclopentadienyl zirconium). As mentioned, the supplemental layers should allow transport of lithium ions. In some embodiments, the organic bridging materials may include additional functional groups that are not involved in layer binding but help facilitate such transport. In an embodiment, these additional functional groups are oxygen-containing, such as (unreacted) hydroxy or ether groups. The organic bridging material may include aliphatic, aromatic, heteroaromatic or a combination of carbon structures. The organic bridging material may include cross-linkable groups such as epoxy groups, double bonds or triple bonds that can be thermally, chemically or photo cross-linked after deposition. The alternating organic-inorganic sublayers within the supplemental layer is not limited to a single set. Different organic materials and inorganic compounds may be used to form the inorganic-organic hybrid supplemental layer. In some embodiments, a supplemental layer having a structure of alternating inorganic-organic hybrid sublayers may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of ranges thereof.

Figure 6:
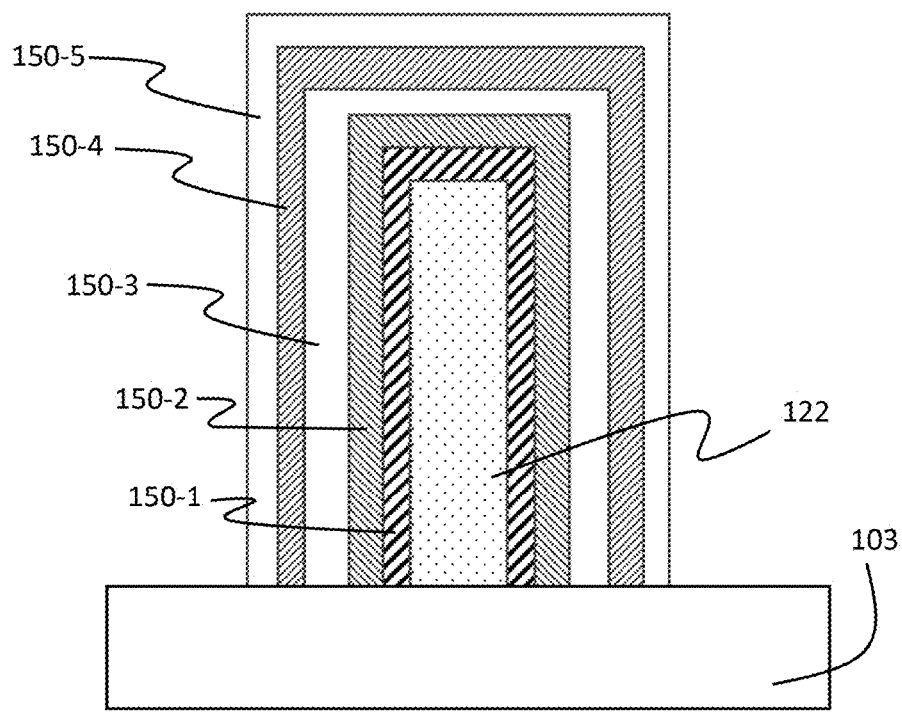
FIG. 6 is a cross-sectional view of an anode according to some embodiments of the present disclosure.

One or more additional supplemental layers may also be included. FIG. 6 shows an anode similar to that of FIG. 1, but with third (150-3), fourth (150-4), and fifth (150-5) supplemental layers. Each supplemental layer has a composition different from an underlying supplemental layer and may be independently selected to include silicon nitride or a metal compound. In some embodiments, the supplemental layers may alternate in composition between two materials. For example, the compositions of supplemental layers 150-2 and 150-4 may be substantially the same. Similarly, the compositions of supplemental layers 150-1 and 150-3, or 150-3 and 150-5, or all of 150-1, 150-3, and 150-5 may be substantially the same. Not shown in FIG. 6, one or more of the additional supplemental layers may coat or partially coat the electrically conductive layer in areas between the lithium storage filamentary structures. In some embodiments, a composition that is "substantially the same" means that the atomic % of each element making up one supplemental layer composition is within 20 atomic % of each element making up the comparative supplemental layer composition, alternatively within 10 atomic %, or alternatively within 5 atomic %. Conversely, in some embodiments, a composition that is "different" is one where the atomic % of at least one element making up one supplemental layer composition is different by at least 20 atomic % relative to a comparative supplemental layer composition, alternatively by at least 25 atomic %, or alternatively by at least 50 atomic %.

Organic Material Capping Layer

Figure 7:
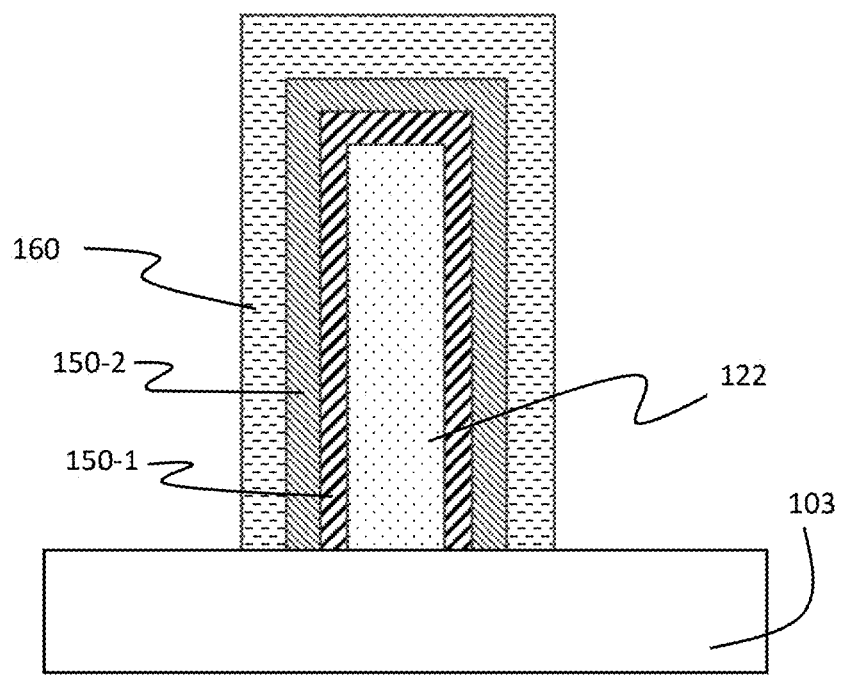
FIG. 7 is a cross-sectional view of an anode according to some embodiments of the present disclosure.

In some embodiments as shown in FIG. 7, the anode may include an organic material capping layer 160 attached (e.g., adsorbed or bonded) to the outermost supplemental layer, in this example, the second supplemental layer 150-2. The outermost supplemental layer may be the supplemental layer disposed farthest from the electrically conductive layer. For example, in FIG. 6, the top portion of fifth supplemental layer 150-5 is disposed farthest from electrically conductive layer 103 and is therefore the outermost supplemental layer. Additionally, the outermost supplemental layer may be the supplemental layer with the largest average or median distance from the electrically conductive layer.

Unlike metalcones, the organic material capping layer of this disclosure does not have an alternating structure of inorganic/organic sublayers. In some embodiments, the organic material capping layer may be provided in part via a chemical reaction between a reactive functional group of an organic material and a supplemental layer having a correspondingly reactive surface. In some embodiments, the organic material capping layer may be a monolayer. In some embodiments, the organic material capping layer may be formed over an outermost supplemental layer containing a metal compound. In some embodiments, the organic material capping layer is formed over an outermost supplemental layer containing a metal oxide. In some embodiments, chemistry similar to that described above with respect to metalcones may be used where organic compounds have appropriate reactive groups such as hydroxy, carboxylic acid, amines and anhydrides, capable of reacting with metal bonds of an outermost supplemental layer (e.g., metal-carbon or metal-halogen). In some embodiments, the outermost supplemental layer may not initially include metal-carbon or metal-halogen bonds, but its surface may be modified to include such bonds prior to treating with the reactive organic compound.

Alternatively, rather than reacting with metal-carbon or metal-halogen bonds, some organic materials may react with, or chemisorb to, a metal oxide- or metal hydroxide-containing outermost supplemental layer, e.g., aluminum oxide or titanium oxide. Such organic materials may include appropriate functional groups such as hydroxyl, carboxylic acid, amines, amino acid, esters, ethers, acid chlorides or anhydrides to aid in the reaction or chemisorption. The organic compounds forming the organic material capping layer may include small molecules, large molecules or polymers so long as they have appropriate reactive groups. Depending on the particular properties of the chemical, the organic compound may be applied by vapor deposition, from a solution in an inert solvent or as a neat liquid. The organic materials may include additional functional groups that are not involved in layer binding that help facilitate transport of lithium ions. In some embodiments, these additional functional groups are oxygen-containing, such as hydroxy or ether groups, or alternatively carboxylate or sulfonate groups. The organic material may include cross-linkable groups such as epoxy, double bonds, or triple bonds that may be thermally, chemically or photo cross-linked after deposition. The organic compounds may include aliphatic, aromatic, heteroaromatic, or a combination of carbon structures. The organic material capping layer may have greater flexibility than pure inorganic materials and can be tailored to provide high lithium ion diffusion.

Figure 8A:
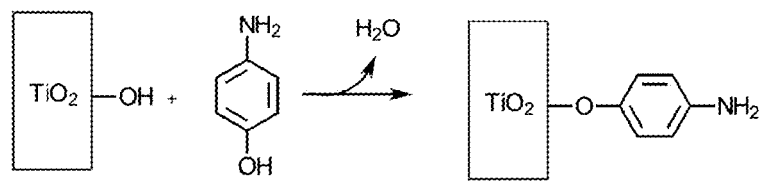
FIGS. 8A-8C show an example set of processing steps for modifying a metal oxide surface with a material capable of polymerization or cross-linking.
Figure 8B:
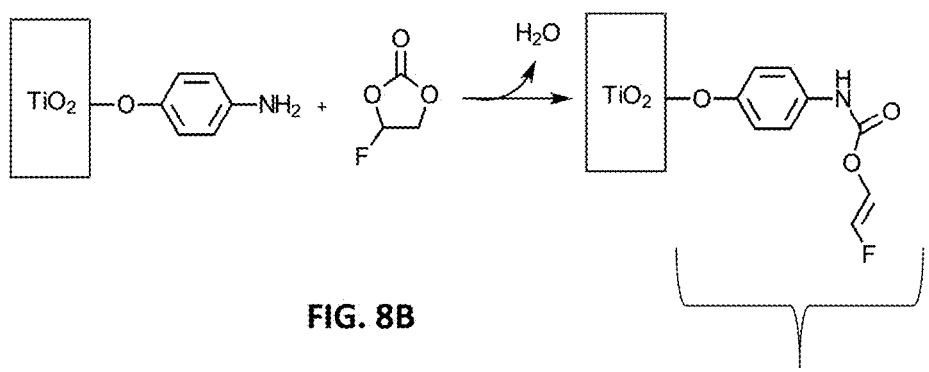
Figure 8C:
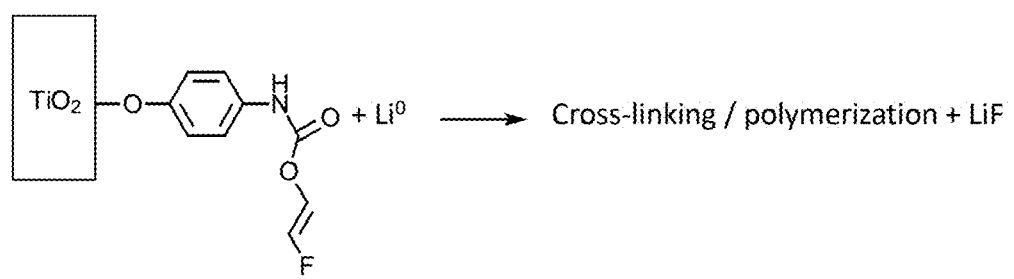

In some embodiments, a supplemental layer surface may include or bind a first organic material that can then react with another organic material to form a reaction product, for example, a polymerizable material. FIG. 8 shows one such example. In this example, aminophenol is first bound to a surface of a metal oxide/hydroxide, e.g., titanium dioxide having some hydroxy groups at the surface (FIG. 8A). The metal oxide/hydroxide may be the surface of an outermost supplemental layer. The free amine group is then reacted with fluoroethylenecarbonate (FEC), FIG. 8B. FEC is sometimes used in conventional lithium-ion batteries as a stabilizing additive in the electrolyte. In this embodiment, however, the FEC reacts with the amine to form a fluorinated double bond that, during the first battery lithiation step, can cross link or polymerize with release of LiF (FIG. 8C). The product of the reaction of the bound aminophenol and FEC may be the capping layer 160 in this embodiment.

Many of the above-mentioned methods may result in organic material capping layers that that are largely conformal with the contours of the underlaying supplemental layer, which in some embodiments, may provide more control over the critical interfaces than simply coating a polymer over the array of lithium storage filamentary structures. In some embodiments, the lithium ion conductivity of the organic material capping layer may be at least $10'$S/cm, alternatively at least $10'$S/cm, alternatively at least $10^{-5}$ S/cm, or alternatively at least $10'$S/cm.

In some embodiments, rather than having first and second supplemental layers, the anode may include just a single supplemental layer and an organic material capping layer provided over at least a portion of the single supplemental layer. The single supplemental layer may include silicon nitride or a metal compound, as previously described with respect to other supplemental layers.

Interstitial Layer

Figure 9:
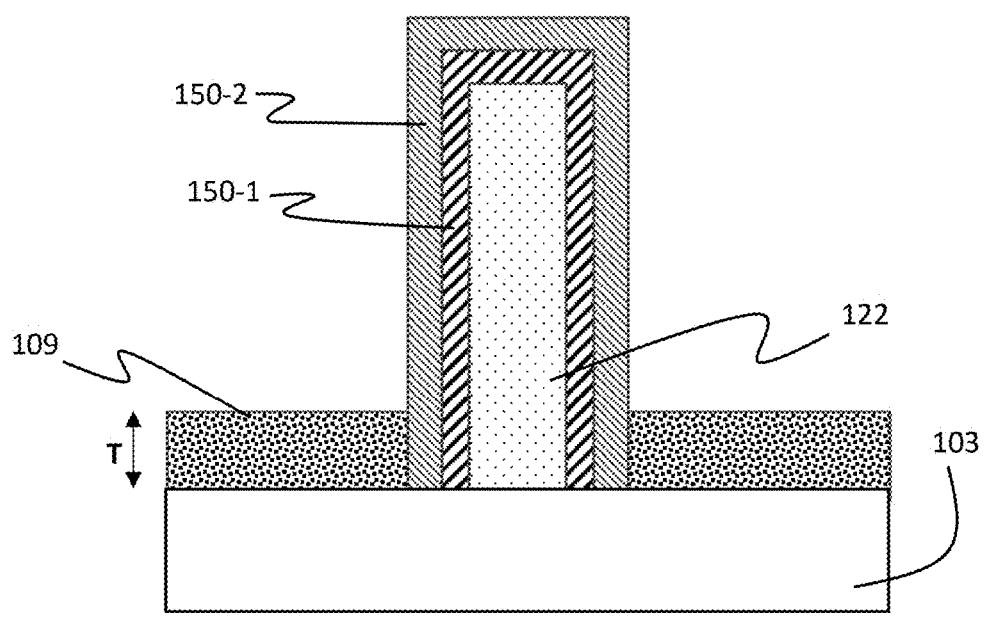
FIG. 9 is a cross-sectional view of an anode according to some embodiments of the present disclosure.

In some embodiments, FIG. 9 shows interstitial layer 109 provided over the current collector and filling space between adjacent lithium storage filamentary structures, at least at the base of such structures. In this figure, it is provided after formation of the first and second supplemental layers, but it in other embodiments it could have been provided prior to application of one or both of these supplemental layers. In some embodiments, interstitial layer 109 may include a polymer or other insulator that adds structural support to the base of the lithium storage filamentary structures to reduce delamination or breakage at the current collector. In some embodiments, the interstitial layer may help insulate exposed portions of the current collector from unwanted electrochemical reactions.

In an embodiment, interstitial layer 109 may be a coating formed by a sol gel reaction. For example, a coating solution may include a solvent, a hydrophilic polymer, a reactive sol-gel precursor and an acid- or base-catalyst. The polymer may be, for example, a polyethylene oxide (PEO), in particular, an hydroxy-modified polyethylene oxide ([PEO]n-OHm) where n is the degree of polymerization of the polymer and m is the degree of substitution of hydroxyl. Alternatively, the hydrophilic polymer may instead be an hydroxy-modified poly-vinylpyrrolidone. The reactive sol-gel precursor may be a metal alkoxide including, but not limited to, tetraethyleneoxidesilane (TEOS). The mechanical properties may be controlled by the ratio of ([PEO]n-OHm) to TEOS. The higher the ratio, the more hydrophilic the composite will be. The ionic conductivity will generally be higher as well. The lower the ratio, the stronger the composite will generally be. These generalizations may further depend on the particular chemical features of the polymer.

Interstitial layer 109 may not be confined solely to the base region of the lithium storage filamentary structures. In some embodiments, the thickness T of interstitial layer 109 may be at least 2% the average height of the lithium storage filamentary structures, alternatively at least 5%, alternatively at least 10%, alternatively at least 20%, alternatively at least 30%, alternatively at least 50%, alternatively at least 75%, alternatively at least 100%, alternatively at least 125%. In some embodiments the interstitial layer is conductive to lithium ions, including but not limited to, when the thickness of the interstitial layer is at least 5% of the average height of the lithium storage filamentary structures. In some embodiments, the lithium ion conductivity of the interstitial layer may be at least $10^{-7}$ S/cm, alternatively at least $10'$S/cm, alternatively at least $10^{-5}$ S/cm, or alternatively at least $10^{-4}$ S/cm.

Other Anode Features

In some embodiments, the current collector may include one or more features to ensure that a reliable electrical connection can be made.

In some embodiments the anode is at least partially prelithiated, i.e., the lithium storage filamentary structures include some lithium ("lithiated filamentary structures") prior to final battery assembly prior along with a cathode. In some embodiments, lithium may be incorporated into the lithium storage filamentary structures before forming one or more supplemental layers. In some embodiments, lithium may be incorporated into the lithium storage filamentary structures after forming one or more supplemental layers.

Note that the term "lithiated filamentary structure" simply means that at least some of the potential storage capacity of the lithium storage filamentary structure is filled, but not necessarily all. In some embodiments, the lithiated filamentary structures may include lithium in a range of 1% to 10% of their theoretical lithium storage capacity, alternatively 10% to 20%, alternatively, 20% to 50%, alternatively 50% to 100%, alternatively 5% to 50%, or any combination of ranges thereof.

In some embodiments, one or more supplemental layers may be formed on the lithium storage filamentary structures prior to prelithiation. In some embodiments, supplemental layers may be used to control the rate of lithium incorporation into the lithium storage filamentary structures.

In some embodiments prelithiation may include depositing lithium metal over the lithium storage filamentary structures, with or without one or more supplemental layers, by evaporation, e-beam or sputtering. Alternatively, prelithiation may include contacting the lithium storage filamentary structures, with or without one or more supplemental layers, with a reductive lithium organic compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage filamentary structures, with or without one or more supplemental layers, with a lithium metal-containing material. The lithium metal-containing material may include a lithium foil, a lithium metal layer provided on a substrate, or a stabilized lithium metal powder. Stabilized lithium metal powders ("SLMP") typically have a phosphate, carbonate or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium.

In some embodiments, prelithiation may include a thermal treatment step during lithium incorporation, after lithium incorporation, or both during and after. The thermal treatment may assist in the incorporation of the lithium into the lithium storage filamentary structures, for example by promoting lithium diffusion. In some embodiments, thermally treating includes exposing the anode to a temperature in a range of 50° C. to 250° C. Thermal treatment may be performed under controlled atmosphere, e.g., under vacuum or argon atmosphere to avoid unwanted reactions with oxygen, nitrogen, water or other ambient gasses.

In some embodiments, prelithiation may soften the lithium storage filamentary structures, for example, due to the formation of a lithium-silicon alloy. This softening may cause problems in some processes, for example, roll-to-roll processes whereby the softened lithium storage material begins to stick to rollers or to itself during winding. By providing at least one supplemental layer, alternatively at least two supplemental layers, prior to prelithiation, the structural integrity and processability of the anode may be improved during and after prelithiation. In some embodiments, the supplemental layer(s) may act as a hard interface with other surfaces to prevent or reduce contact of such surfaces with the softened lithium storage material.

Thermal treatments were discussed above with respect to prelithiation, but in some embodiments the anode may be thermally treated prior to battery assembly, with or without a prelithiation step. In some embodiments, thermally treating the anode may improve adhesion of the various layers or electrical conductivity, e.g., by inducing migration of metal from the current collector or atoms from the supplemental layer into the lithium storage filamentary structures. In some embodiments, thermally treating the anode may be done in a controlled environment having a low oxygen and water (e.g., less than 10 ppm or partial pressure of less than 0.1 Torr, alternatively less than 0.01 Torr content to prevent degradation). In some embodiments, anode thermal treatment may be carried out using an oven, infrared heating elements, contact with a hot plate or exposure to a flash lamp. The anode thermal treatment temperature and time depend on the materials of the anode. In some embodiments, anode thermal treatment includes heating the anode to a temperature of at least 50° C., optionally in a range of 50° C. to 600° C., alternatively 100° C. to 250° C., alternatively 250° C. to 350° C., alternatively 350° C. to 450° C., alternatively 450° C. to 600° C., or a combination of these ranges. In some embodiments, a thermal treatment may be applied for time period of 0.1 to 120 minutes.

In some embodiments one or more processing steps described above may be performed using roll-to-roll methods wherein the electrically conductive layer is in the form of a rolled film, e.g., a roll of metal foil.

Battery Features

The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, a single anode/cathode stack can be formed into a so-called jellyroll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference. In some embodiments a physical pressure is applied between the anode and cathode, e.g., using a tensioned spring or clip, a compressible film or the like. Confinement, pressure or both may help ensure that the anode remains in active contact with the current collector during formation and cycling, which may cause expansion and contraction of the lithium storage filamentary structures.

Cathode

Examples of positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium, and combinations thereof. Cathode active materials are typically provided on, or in electrical communication with, an electrically conductive cathode current collector.

Current Separator

The current separator allows ions to flow between the anode and cathode but prevents direct electrical contact. Such separators are typically porous sheets. Non-aqueous lithium-ion separators may be single layer or multilayer polymer sheets, typically made of polyolefins, especially for small batteries. Most commonly, these are based on polyethylene or polypropylene, but polyethylene terephthalate (PET) and polyvinylidene fluoride (PVdF) can also be used. For example, a separator may have >30% porosity, low ionic resistivity, a thickness of ~10 to 50 µm and high bulk puncture strengths. Separators may alternatively include ceramic materials or multilayer structures, e.g., to provide higher mechanical and thermal stability. In some embodiments, a current separator may include an ion-conductive layer (e.g., formed of one of the above materials or some other ion-conductive material) that is coated directly on the anode, on the cathode, or both the anode and cathode.

Electrolyte

The electrolyte in lithium-ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio of a cyclic carbonate to a linear ester is between about 1:9 to 10:1, alternatively 2:8 to 7:3.

A salt for liquid electrolytes may include one or more of the following non-limiting examples: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7)_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), LiFSI (lithium bis(fluorosulfonyl)imide), LiTDI (lithium 4,5-dicyano-2-(trifluoromethyl)imidazole), and combinations thereof.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M. In some embodiments, the electrolyte may include a saturated solution of a lithium salt and excess solid lithium salt.

In some embodiments, the battery electrolyte includes a non-aqueous ionic liquid and a lithium salt.

A solid electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymers of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO—PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of an organic solvent such as those listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

Instead of anodes having lithium storage filamentary structures, in some embodiments, the supplemental layers and optional capping layer described above may be provided over alternative lithium storage structures, such as those described in U.S. patent application Ser. No. 16/285,842 (filed Feb. 26, 2019), U.S. patent application Ser. No. 16/909,008 (filed Jun. 23, 2020), U.S. patent application Ser. No. 16/991,613 (filed Aug. 12, 2020), U.S. patent application Ser. No. 16/997,110 (filed Aug. 19, 2020), U.S. patent application Ser. No. 16/997,105 (filed Aug. 19, 2020), U.S. patent application Ser. No. 16/998,773 (filed Aug. 20, 2020), U.S. patent application Ser. No. 17/002,311 (filed Aug. 25, 2020), PCT Application No. PCT/US2021/026179 (filed Apr. 7, 2021), PCT Application No. PCT/US2021/039426 (filed Jun. 28, 2021), and PCT Application No. PCT/US2021/064018 (filed Dec. 17, 2021), each of which is incorporated herein by reference in its entirety for all purposes. Instead of anodes, in some embodiments, the supplemental layers and optional capping layer described above may be provided over the cathode or coated over cathode active material particles that may be provided in a binder. Such cathode or cathode active materials may include any of the cathode materials mentioned above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. An anode for an energy storage device comprising:
a current collector comprising an electrically conductive layer;
a plurality of lithium storage filamentary structures in contact with the electrically conductive layer; and
a plurality of supplemental layers for each lithium storage filamentary structure of the plurality of lithium storage filamentary structures, wherein:
a first supplemental layer overlays at least a portion of the respective filamentary structure, the first supplemental layer comprising silicon nitride or a first metal compound, wherein the first metal compound comprises a metal oxide, a metal nitride, a metal oxynitride, a lithium-containing material, or a metalcone,
a second supplemental layer overlays at least a portion of the first supplemental layer, the second supplemental layer having a composition different from the first supplemental layer and comprising silicon nitride or a second metal compound, wherein the second metal compound comprises a metal oxide, a metal nitride, a metal oxynitride, a lithium-containing material, or a metalcone, and
a third supplemental layer overlaying at least a portion of the second supplemental layer, the third supplemental layer having a composition different from the second supplemental layer and comprising silicon nitride or a third metal compound.

2. The anode of claim 1, wherein the first supplemental layer comprises the first metal compound.

3. The anode of claim 2, wherein the first metal compound comprises a transition metal.

4. The anode of claim 1, wherein the second supplemental layer comprises the second metal compound.

5. The anode of claim 4, wherein the second metal compound comprises a transition metal.

6. The anode of claim 1, wherein the first supplemental layer, the second supplemental layer, or both the first supplemental layer and the second supplemental layer comprises an independently selected metal oxide.

7. The anode of claim 6, wherein the metal oxide comprises a transition metal.

8. The anode of claim 6, wherein the metal oxide comprises an oxide of aluminum, titanium, or vanadium.

9. The anode of claim 1, wherein the first supplemental layer or the second supplemental layer, or both the first supplemental layer and the second supplemental layer comprises an independently selected metalcone.

10. The anode of claim 9, wherein the metalcone comprises a transition metal.

11. The anode of claim 9, wherein the metalcone comprises zinc, aluminum, titanium, or zirconium.

12. The anode of claim 1, wherein the first supplemental layer comprises silicon nitride and the second supplemental layer comprises the second metal compound.

13. The anode of claim 1, wherein the first supplemental layer comprises a metalcone and the second supplemental layer comprises a metal oxide.

14. The anode of claim 1, wherein the composition of the third supplemental layer is substantially the same as the composition of the first supplemental layer.

15. The anode of claim 1, wherein the plurality of supplemental layers comprises a fourth supplemental layer overlaying at least a portion of the third supplemental layer, the fourth supplemental layer having a composition different from the third supplemental layer and comprising silicon nitride or a fourth metal compound.

16. The anode of claim 15, wherein the composition of the fourth supplemental layer is substantially the same as the composition of the second supplemental layer.

17. The anode of claim 16, wherein:
the first supplemental layer and the third supplemental layer comprise a first metal oxide, and
the second supplemental layer and the fourth supplemental layer comprise a second metal oxide.

18. The anode of claim 1, a lithium ion-conducting organic material capping layer provided over a distal supplemental layer of the plurality of supplemental layers, wherein the distal supplemental layer is disposed farthest from the electrically conductive layer.

19. The anode of claim 1, wherein each lithium storage filamentary structure of the plurality of lithium storage filamentary structures comprises silicon.

20. The anode of claim 1, wherein the plurality of lithium storage filamentary structures (i) has an average height in a range of 0.2 um to 100 um, (ii) has an average maximum width in a range of 0.1 µm to 10 µm, and (iii) each has an aspect ratio of at least 2:1.

21. The anode of claim 1, wherein the first supplemental layer is an oxide of titanium, and the second supplemental layer is an oxide of aluminum.

* * * * *